United States Patent
Meche (10) Patent No.: US 6,393,304 B1
(45) Date of Patent: May 21, 2002

(54) METHOD FOR SUPPORTING NUMERIC VOICE DIALING

(75) Inventor: Paul S. Meche, Richardson, TX (US)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/300,559

(22) Filed: Apr. 27, 1999

Related U.S. Application Data (60) Provisional application No. 60/083,862, filed on May 1, 1998.

(51) Int. Cl.⁷ .................................................. H04M 1/00
(52) U.S. Cl. .................. 455/563; 455/564; 455/550; 379/88.03; 379/355.02; 379/355.06; 379/355.07
(58) Field of Search ........................ 455/564, 569, 455/566, 563, 550, 575; 379/88.03, 88.02, 88.01, 355.01, 355.02, 355.05, 355.06, 355.07

(56) References Cited

U.S. PATENT DOCUMENTS

| | | | |
|---|---|---|---|
| 5,042,063 A | * 8/1991 | Sakanishi et al. | 379/88.03 |
| 5,222,121 A | * 6/1993 | Shimada | 379/88.03 |
| 5,301,227 A | * 4/1994 | Kamei et al. | 379/88.03 |
| 5,371,779 A | * 12/1994 | Kobayashi | 455/563 |
| 5,481,595 A | * 1/1996 | Ohashi et al. | 455/564 |
| 5,640,485 A | 6/1997 | Ranta | 704/251 |
| 5,802,149 A | * 9/1998 | Hanson | 379/88.03 |
| 5,805,672 A | * 9/1998 | Barkat et al. | 379/88.03 |
| 5,864,603 A | 1/1999 | Haavisto et al. | 379/88.01 |

* cited by examiner

Primary Examiner—William Trost
Assistant Examiner—Rafael Perez-Gutierrez
(74) Attorney, Agent, or Firm—Perman & Green, LLP (57) ABSTRACT

A method is provided for enabling a user of a cellular radiotelephone (10) having a keypad (22) to assign selected speech utterances to keys 22a, 22b of the keypad 22. The method comprises the steps of: (a) prompting the user to depress at least one of the keys 22a, 22b; (b) in response to the user depressing at least one of the keys 22a, 22b, prompting the user to utter speech into a user-interface (19) of the radiotelephone (10) for assigning the speech to the depressed at least one key 22a, 22b; and (c) in response to the user uttering speech into the user-interface (19), storing the uttered speech in a memory (24) for identifying the depressed at least one key 22a, 22b with the uttered speech. Also in accordance with the invention, the user may dial a telephone number by simply uttering, into the user-interface (19), speech identifying those ones of the keys 22a, 22b which correspond to alpha-numeric characters of the telephone number.

2 Claims, 7 Drawing Sheets

FIG.1a

| X, KEY | Y, VALUE | Z, ASSIGNED VOICE ID |
|---|---|---|
| 22a1 | 1 | |
| 22a2 | 2 | |
| 22a3 | 3 | |
| 22a4 | 4 | |
| 22a5 | 5 | |
| 22a6 | 6 | |
| 22a7 | 7 | |
| 22a8 | 8 | |
| 22a9 | 9 | |
| 22a10 | * | |
| 22a11 | 0 | |
| 22a12 | # | |
| 22b1 | SEND | |

Rows labeled $X_1-X_n$, values $Y_1-Y_n$, assigned voice IDs $Z_1-Z_n$.

METHOD FOR SUPPORTING NUMERIC VOICE DIALING

This application claims benefit of Provisional application No. 60/083,862, filed May 1, 1998.

FIELD OF THE INVENTION

This invention relates to radiotelephones and, in particular, to radiotelephones that support voice dialing functions.

BACKGROUND OF THE INVENTION

It is known to employ voice recognition features in radiotelephones for controlling various telephone operations in accordance with user voice commands. By example, in at least some conventional radiotelephones having a voice recognition capability, automatic dialing is provided in response to a user speaking a telephone number into the radiotelephone. Such radiotelephones typically include a memory which stores speech-related information representing a plurality of user-spoken telephone numbers. This information is generally pre-stored in the memory by users of the radiotelephones, and is subsequently employed by the radiotelephones while attempting to recognize a user's speech input specifying that a call be placed to a destination telephone identified by one of the telephone numbers.

For users of these types of radiotelephones, the task of storing each telephone number into the radiotelephone memory can be a burden, especially where a substantial number of telephone numbers need to be stored. Another drawback is that the storage of a substantial number of these telephone numbers can cause a large portion of the radiotelephone memory to be occupied.

It can therefore be appreciated that it would be desirable to provide a radiotelephone having a capability for automatically dialing a telephone number for placing a call in response to a user speaking a telephone number into the radiotelephone, without requiring that the user pre-store the telephone number in the radiotelephone before the call is attempted.

OBJECTS OF THE INVENTION

It is an object of this invention to provide a radiotelephone having a keypad, wherein the radiotelephone has a capability for enabling a user to assign spoken words, such as digits or other selected alpha-numeric characters, to selected keys of the keypad, and wherein the radiotelephone also has a capability for automatically dialing a telephone number for placing an outgoing call in response to the user speaking, into the radiotelephone, words identifying individual ones of the keys corresponding to the telephone number.

Further objects and advantages of this invention will become apparent from a consideration of the drawings and ensuing description.

SUMMARY OF THE INVENTION

The foregoing and other problems are overcome and the objects of the invention are realized by methods and apparatus in accordance with embodiments of this invention. A method of this invention is disclosed for operating a mobile terminal, such as cellular radiotelephone, that has a memory, a keypad having a plurality of keys, a user-interface, such as a microphone, and a display device for displaying information, including menu-related messages, to a user.

In accordance with one aspect of this invention, a method is provided for enabling the user of the mobile terminal to assign spoken words to selected keys of the keypad of the mobile terminal, thereby identifying the selected keys with the spoken words. The method comprises steps of: (a) depressing at least one key of the keypad, each key corresponding to a respective alpha-numeric character; and (b) speaking at least one word into the microphone of the mobile terminal for assigning the spoken at least one word as an identifier for the at least one key depressed in step (a).

Also in accordance with the invention, the user can command the mobile terminal to dial a telephone number for placing an outgoing call by speaking, into the microphone, words identifying those ones of the keys which correspond to alpha-numeric characters of the telephone number.

BRIEF DESCRIPTION OF THE DRAWINGS

The above set forth and other features of the invention are made more apparent in the ensuing Detailed Description of the Invention when read in conjunction with the attached Drawings, wherein:

FIG. 1b shows a data table T1 that forms a portion of a memory 24 of the mobile terminal of FIG. 1a;

Identically labelled elements appearing in different ones of the figures refer to the same elements but may not be referenced in the description for all figures.

DETAILED DESCRIPTION OF THE INVENTION

Figure 1A:
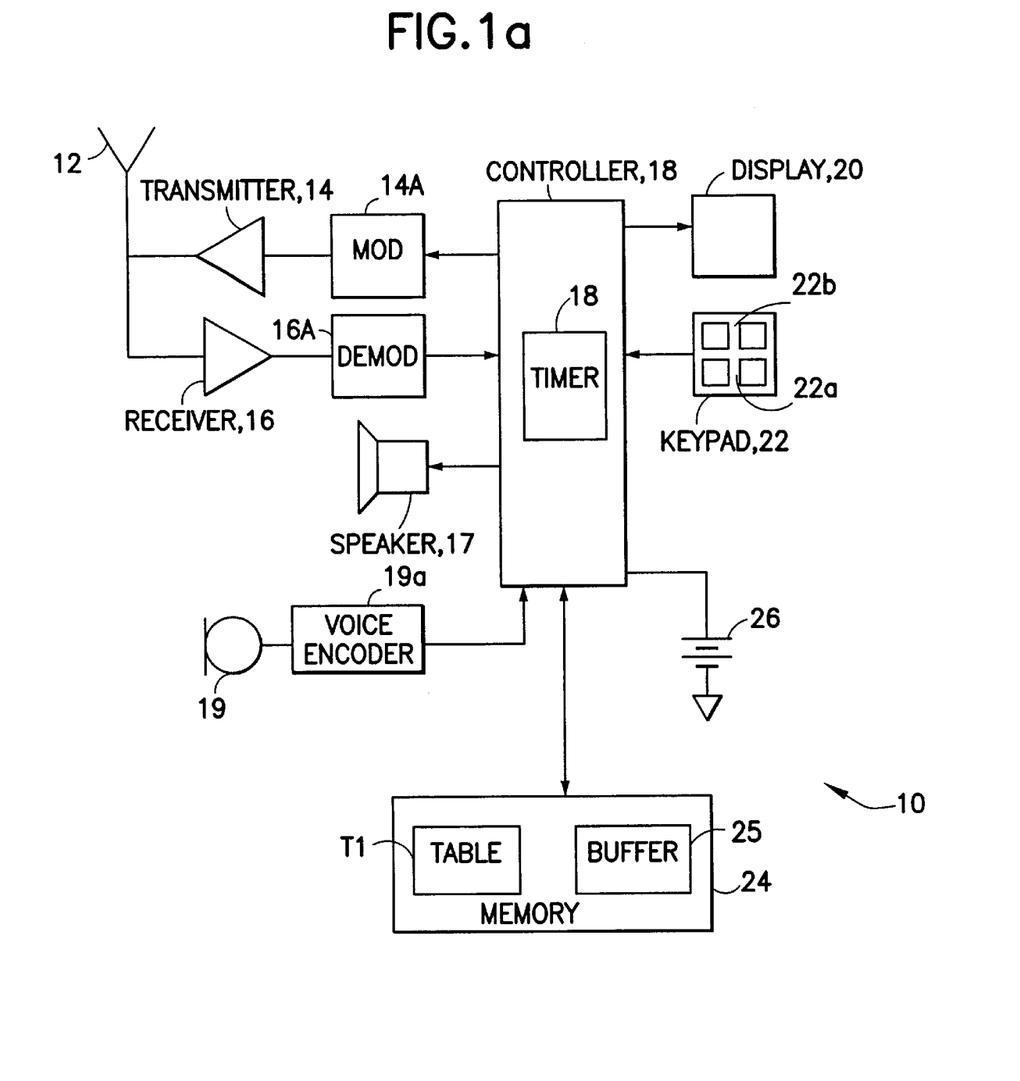
FIG. 1a is a block diagram of a mobile terminal that is constructed and operated in accordance with this invention.
Figure 2:
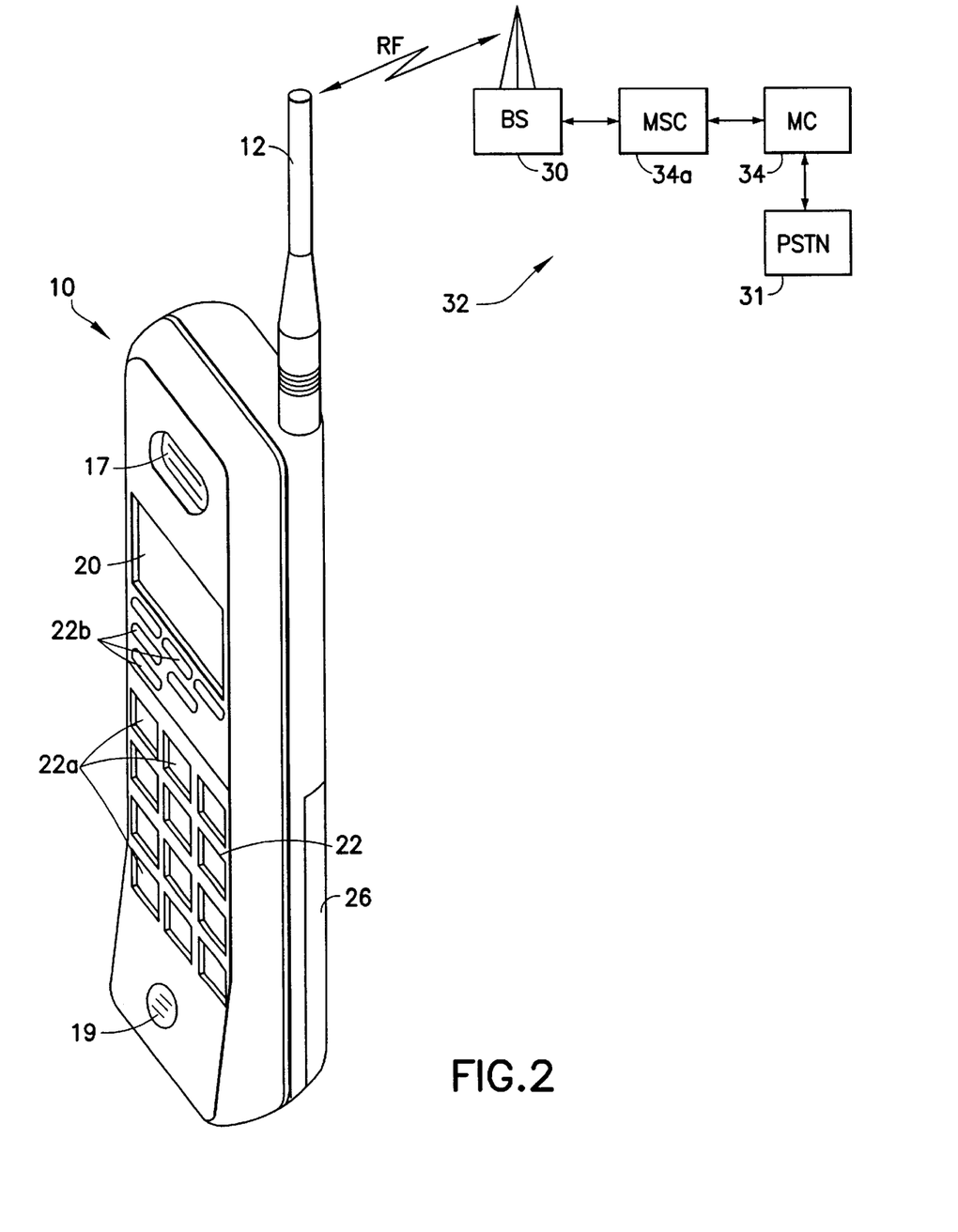
FIG. 2 is an elevational view of the mobile terminal shown in FIG. 1a, and further illustrates a cellular communication system 32 to which the mobile terminal is bidirectionally coupled through wireless RF links.

Reference is made to FIGS. 1a and 2 for illustrating a mobile terminal 10, in particular a cellular radiotelephone, that is suitable for practicing this invention. The mobile terminal 10 includes an antenna 12 for transmitting signals to and for receiving signals from a base site or base station 30. The base station 30 is a part of a cellular network 32 that includes a message switching center (MSC) 34a and a message center (MC) 34. The MSC 34a controls the forwarding of messages to and from the mobile terminal 10 when the terminal is registered with the network, and also controls the forwarding of messages for the mobile terminal 10 to and from MC 34. These messages may include, by example, voice messages received by the MSC 34a from users of Public Switched Telephone Network (PSTN) telephones 31.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively.

These signals include signalling information in accordance with the air interface standard of the applicable cellular system, and also user speech and/or user generated data.

A user interface includes a conventional speaker 17, a display 20, and a user input device, typically a keypad 22, all of which are coupled to the controller 18. A transducer device, such as a microphone 19, is also provided, and has an output that is coupled to a voice encoder (hereinafter referred to as a "vocoder") 19a. The vocoder 19a has an output which is coupled to the controller 18. The mobile terminal 10 also includes a battery 26 for powering the various circuits that are required to operate the terminal. In one embodiment of the invention, a timer 18a is included in the controller 18.

The vocoder 19a may be any suitable type of vocoder 19a known in the art. By example, the vocoder 19a may include a GSM enhanced full rate encoder similar to that described in a European Telecommunication Standard entitled "Digital Cellular Telecommunications System; Enhanced Full Rate (EFR) Speech Transcoding (GSM 06.60)", March 1997. Also by example, the vocoder 19a may be in accordance with that defined in section 2.1.3.3.2 of IS-136.2, Rev. A, or later revisions thereof.

The keypad 22 includes the conventional numeric (0–9) and related keys (#, *) 22a, and also other keys 22b that are used for operating the mobile terminal 10. These other keys 22b include, by example, a SEND key, various menu scrolling and soft keys, and a PWR key. An exemplary embodiment of a portion of the keypad 22 is shown in FIG. 1c, wherein the keys 22a are shown in greater detail and are further identified by reference numerals 22a1–22a12, and wherein one of the keys 22b is also shown and is further identified by reference numeral 22b1 (other ones of the keys 22b are not shown in FIG. 1c). It should be noted that, throughout this description, the reference numeral 22a is used interchangeably with reference numerals 22a1–22a12, collectively.

It should be understood that the mobile terminal 10 can be a vehicle mounted or a handheld device. It should be further appreciated that the mobile terminal 10 can be capable of operating with one or more air interface standards, communication protocols, modulation types, and access types. By example, the mobile terminal may be capable of operating in accordance with wireless communication protocols IS-136, GSM, IS-95 (CDMA), and wideband CDMA. Some narrowband AMPS (NAMPS), as well as TACS, mobile terminals may also benefit from the teaching of this invention, as should dual or higher mode phones (e.g., digital/analog or TDMA/CDMA/analog phones). In general, the teaching of this invention applies to any radiotelephone, pager, personal communicator, or other device that has a capability for being trained to recognize words spoken by a user (i.e., to recognize acoustic characteristics of a user's utterances), and that includes a user input mechanism, such as a keypad, with which the user can manually provide input signals to the device. It should thus be clear that the teaching of this invention is not to be construed to be limited to any one particular type of mobile terminal, air interface standard, or communication protocol.

The mobile terminal 10 also includes various memories, shown collectively as the memory 24, wherein are stored a plurality of constants and variables that are used by the controller 18 during the operation of the mobile terminal. For example, the memory 24 stores the number assignment module (NAM) (not shown). An operating program for controlling the operation of controller 18 is also stored in the memory 24 (typically in a ROM device). The memory 24 preferably includes a non-volatile memory.

Figure 1B:
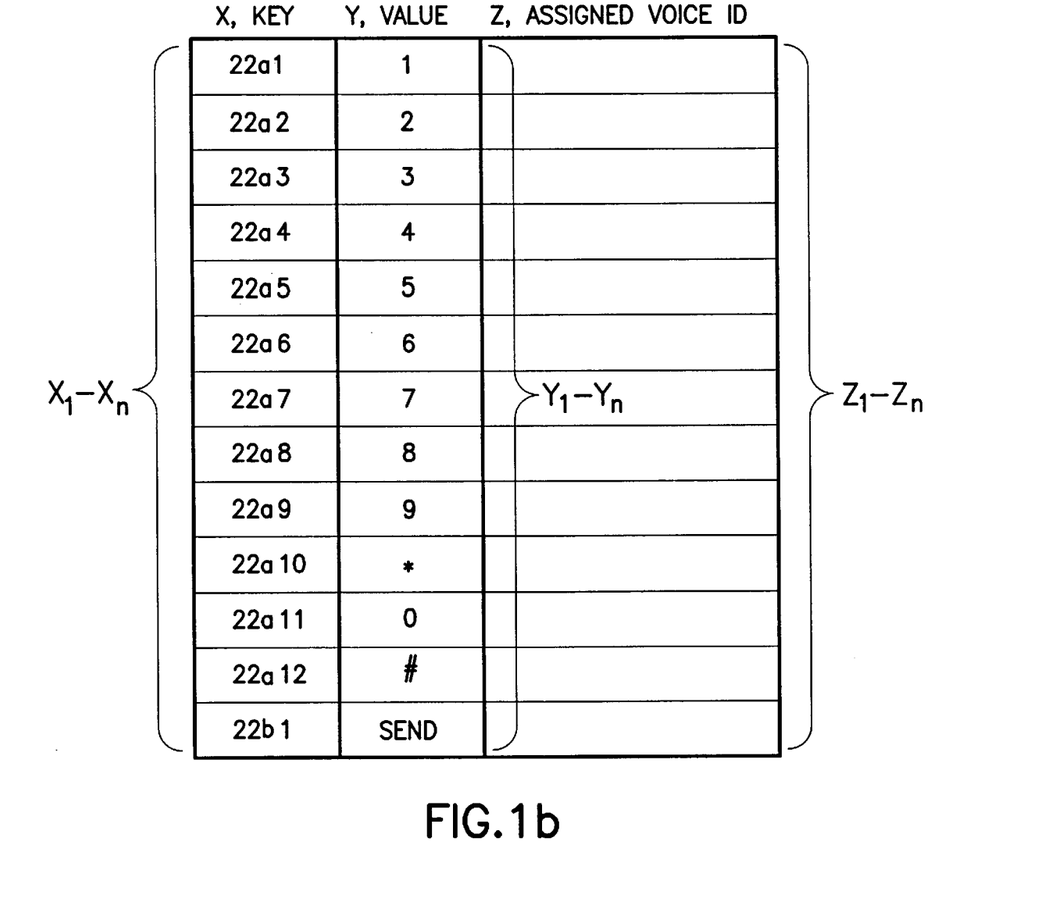
Figure 1C:
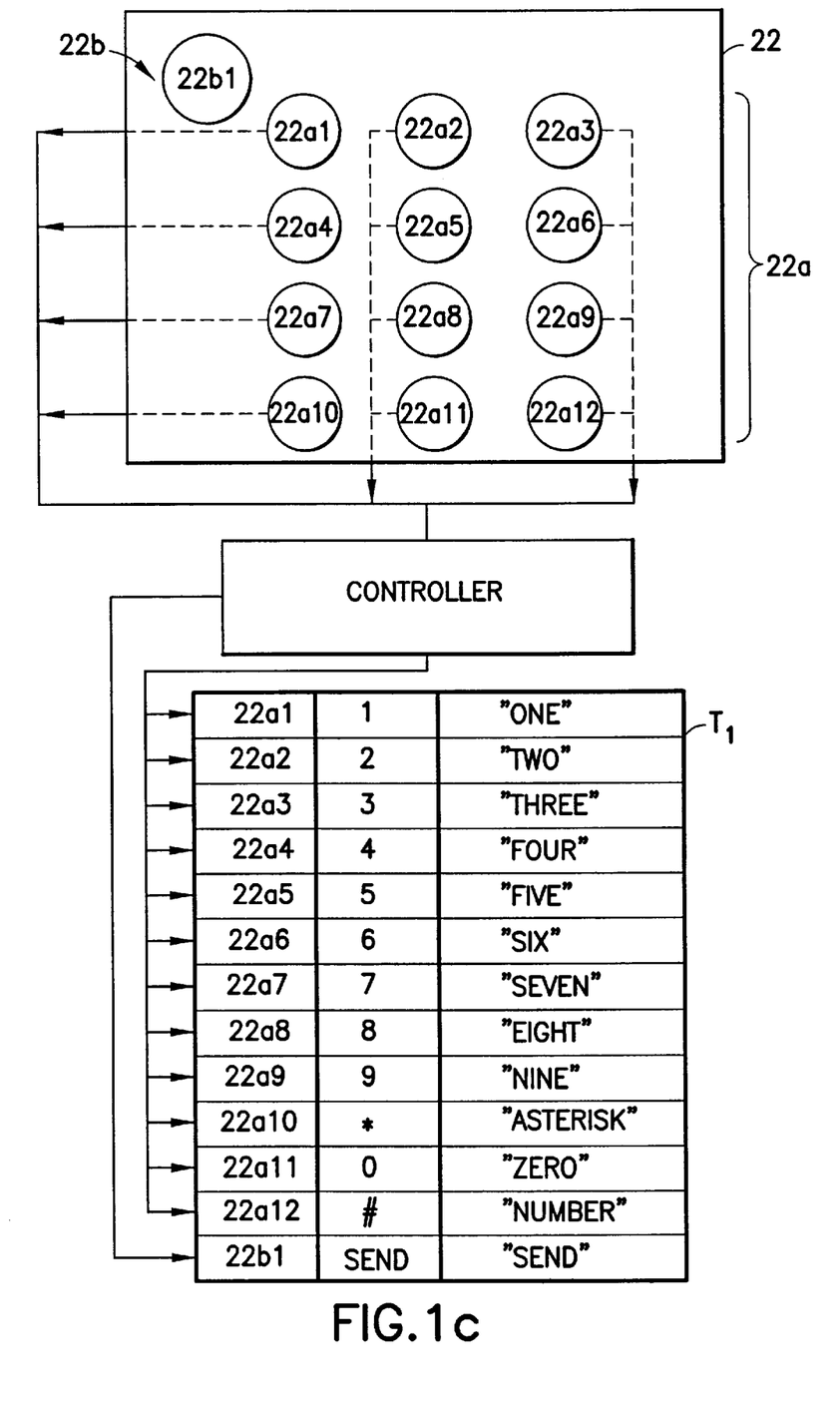
FIG. 1c shows a controller 18 and a portion of a keypad 22 of the mobile terminal of FIG. 1a, and also shows the data table T1 of FIG. 1b.

In accordance with one embodiment of the invention, and referring to FIGS. 1a and 1b, the memory 24 also includes a data table T1 (i.e., a look-up table) having a plurality of columns X, Y, and Z (FIG. 1b). Each column X, Y, and Z includes a respective plurality of memory locations or cells X1–Xn, Y1–Yn, Z1–Zn, for storing particular types of information. By example, in a preferred embodiment the memory locations X1–Xn of column X include information identifying respective ones of the keys 22a–22a12 and 22b1 of keypad 22. The memory locations Y1–Yn of column Y are associated with respective ones of the memory locations X1–Xn of column X, as can be appreciated in view of FIG. 1b. The memory locations Y1–Yn include information representing characters (e.g., digits 0–9, *, #) corresponding to respective ones of the keys 22a1–22a12, and also include information representing a command (e.g., SEND) for the mobile terminal 10 to place a call, wherein the command information corresponds to key 22b1. The memory locations Z1–Zn of column Z are associated with respective ones of the memory locations X1–Xn of column X, and with respective ones of the memory locations Y1–Yn of column Y. Memory locations Z1–Zn are employed for storing information, in particular, information relating to particular acoustic characteristics of user utterances that are input into the mobile terminal 10 by the user for identifying respective ones of the keys 22a1–22a9, 22a11, in accordance with a method of this invention to be described below. The acoustic characteristics will also be described below.

It should be noted that although the invention is described in the context of the memory locations Y1–Yn storing information representing (e.g., 0–9) digit values corresponding to respective ones of the keys 22a1–22a9, 22a11, the invention is not intended to be so limited. By example, memory locations Y1–Yn may also store information representing alphabetic characters (A, B, C, etc.) (not shown) which correspond to respective ones of the keys 22a1–22a9, 22a11, 22b1.

In a preferred embodiment of the invention, the memory 24 as also includes a memory buffer 25 for storing information retrieved from the data table T1 during the performance of a method of the invention, as will be described below.

The operating program stored in the memory 24 includes routines to present messages and message-related functions to the user on the display 20, typically as various menu items. The operating program stored in memory 24 also includes a speech recognition processing program that enables the user to assign selected spoken words to selected ones of the keys 22a1–22a12, 22b1 of keypad 22, for identifying these selected keys 22a1–22a12, 22b1 with the spoken words, in accordance with a keypad programming mode of the invention. The speech recognition processing program also enables the user to command the mobile terminal 10 to automatically dial a telephone number for placing a call to a destination telephone by the user speaking, into the microphone 19, words identifying those ones of the keys which correspond to characters (e.g., digits 0–9, or letters A, B, etc.) of a telephone number for the destination telephone. The routine for implementing these methods is described below in relation to FIGS. 3a, 3b, and 4a–4c.

Figures 3A, 3B:
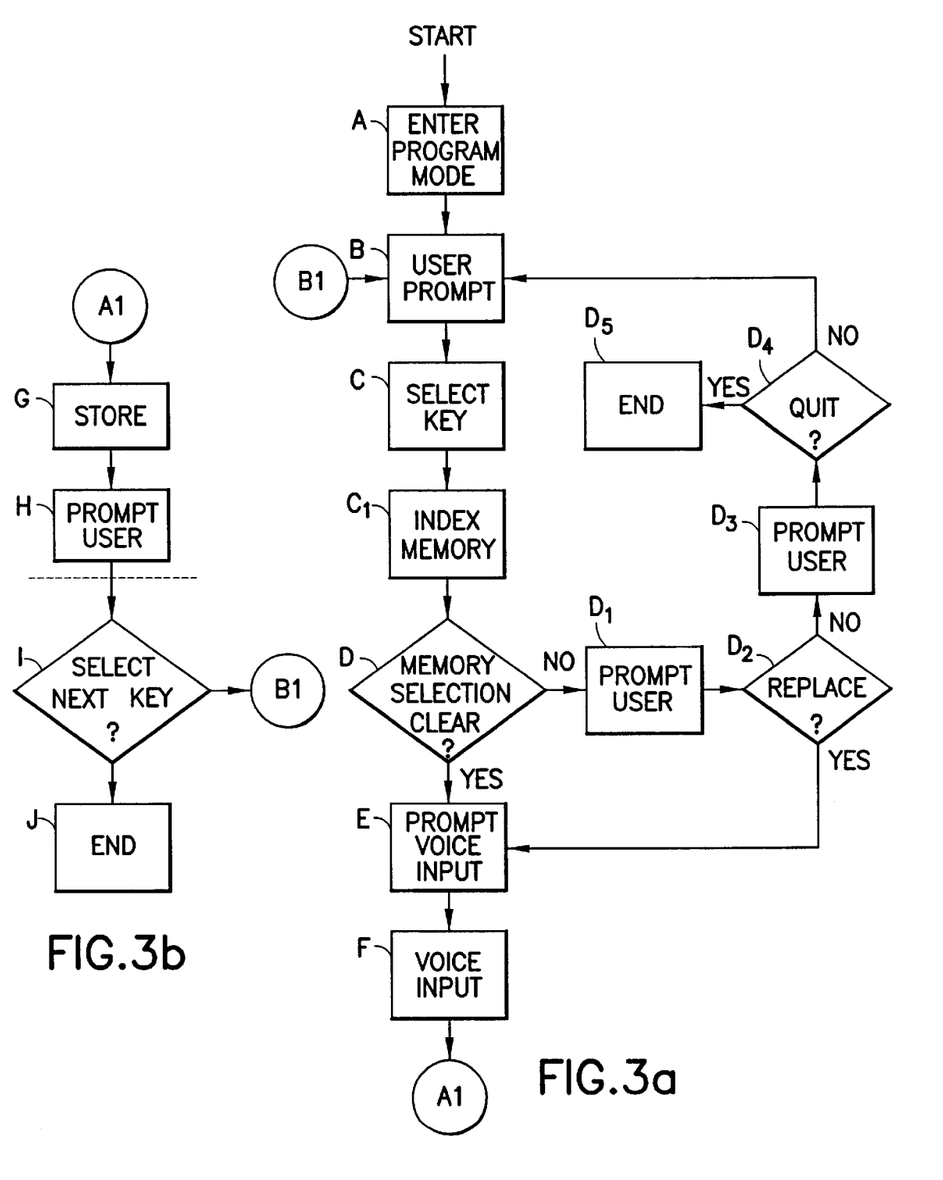
FIGS. 3a and 3b are logic flow diagrams that illustrate a method executed by the mobile terminal shown in FIGS. 1a and 2, in accordance with the invention.

Reference is now made to FIGS. 3a and 3b, for illustrating a method in accordance with this invention. At block A (FIG. 3a) it is assumed that a user of the mobile terminal 10 operates keypad 22 by depressing one or more predetermined keys 22a, 22b for causing the mobile terminal 10 to enter a keypad program mode (also referred to as a "training procedure mode") and a corresponding menu function. After the mobile terminal 10 enters the keypad program mode, the mobile terminal 10 prompts the user via the display 20 to depress a selected one of the keypad keys 22a1–22a12, 22b1, to which the user desires to assign a word (block B). By example, the mobile terminal 10 may prompt the user at block B by presenting a message on the display 20 reading "select key".

Assuming that at block C the user depresses one of the keys 22a1–22a12 or 22b1, then the controller 18 responds at block C1 by indexing one of the memory locations X1–Xn (from column X) that stores information identifying the depressed key, and by then indexing an associated one of the memory locations Z1–Zn from column Z. This may be further understood in view of FIG. 1c, which shows the keypad 22, the controller 18, and the data table T1 of the memory 24. As can be appreciated in view of FIG. 1c, the depression of an individual key 22a1–22a12, 22b1, at block C results in the controller 18 indexing (at block C1) a corresponding one of the memory locations X1–Xn from column X, and also results in the controller 18 indexing a corresponding one of the memory locations Z1–Zn from column Z. More particularly, and as an example, assuming that the user depresses key 22a1 at block C, then the controller 18 responds at block C1 by indexing memory location X1, and by then indexing memory location Z1.

Thereafter, at block D the controller 18 examines the contents of the indexed one of the memory locations Z1–Zn from column Z to determine whether information identifying the depressed key is presently stored therein. If the controller 18 determines that there is no information stored in this indexed memory location Z1–Zn ('yes' at block D), then control passes to block E where another step is performed. This step will be described in detail below.

If the controller 18 determines at block D that there is information stored in the indexed one of the memory locations Z1–Zn from column Z ('no' at block D), then the controller 18 controls the display 20 so as to prompt the user to specify whether or not he wishes to replace the stored information (block D1). By example, the controller 18 may control the display 20 so as to present a message on the display 20 reading "replace existing key identifier?".

After the performance of the step indicated by block D1, the user may specify whether or not he wishes to replace the stored information at block D2 by operation of the keypad 22 (e.g., by depressing one or more predetermined keys 22a, 22b of keypad 22). If the user operates keypad 22 so as to specify 'no' at block D2, then the controller 18 responds by controlling the display 22 so as to prompt the user to specify whether or not he wishes to quit the keypad program mode (block D3).

The user may specify whether or not he wishes to quit the keypad program mode by depressing one or more predetermined keys of keypad 22 (block D4). Assuming that the user operates the keypad 22 so as to specify that he desires to quit the keypad program mode at block D4 ('yes' at block D4), then control passes to block D5 where the keypad program mode is terminated. If the user operates the keypad 22 at block D4 so as to specify that the program mode not be terminated ('no' at block D4), then control passes to block B, where the method continues in the above-described manner.

If, at block D2, the user operates keypad 2 so as to specify that the information stored in the indexed one of the memory locations Z1–Zn be replaced ('yes' at block D2), then control passes to block E.

The step performed by the mobile terminal 10 at block E will now be described. At block E the controller 18 controls the display 20 so as to prompt the user to speak into the microphone 19 a selected word for identifying the individual key 22a1–22a12, 22b1 depressed by the user at block C. By example, the controller 18 may control the display 20 at block E so as to present a message "speak selected word for depressed key" on the display 20. Also by example, the user may be prompted at block E by an audible indicator, such as a tone or series of tones, provided by the speaker 17 under the control of the controller 18.

It is preferred that only a single word (utterance) be assigned by the user to the key 22a1–22a12, 22b1, depressed by the user at block C. This is because in a call dialing mode of the invention (to be described below), which enables the user to dial a telephone number by speaking (into microphone 19) words identifying particular ones of the keys 22a1–22a12 which correspond to digits of the telephone number, the mobile terminal 10 preferably operates by interpreting each individual user-spoken word (e.g., digit) as being associated with a corresponding one of the keys 22a1–22a12, 22b1, rather than interpreting more than a single user-uttered word as being associated with a single key 22a1–22a12, 22b1. This aspect of the invention will be further described below.

Referring again to FIG. 3a, after the mobile terminal 10 prompts the user (at block E) to speak a word for identifying the key 22a1–22a12, 22b1 depressed by the user at block C, control passes to block F where it is assumed that the user speaks a selected word, such as, e.g., a word identifying a digit, into the microphone 19 for assigning the word as an identifier for the individual key 22a1–22a12, 22b1. The microphone 19 then responds by generating an electrical signal (e.g., an analog signal) which corresponds to the user's voice input. The electrical signal is repeatively sampled and digitized and the digital values are provided to the vocoder 19a, which responds by outputting to the controller 18 information representing one or more acoustic characteristics of the user's utterance. These acoustic characteristics may include, for example, amplitude information representing an envelope of the user's utterance and/or spectral characteristics (e.g., tone/frequency content) of the user's utterance. For the purposes of this description, the information representing the acoustic characteristics of user's utterance is also hereinafter referred to as "acoustic characteristic information".

Control then passes through connector A1 to block G (FIG. 3b), where the controller 18 responds to receiving the acoustic characteristic information from the vocoder 19a by storing the information in the memory location Z1–Zn previously indexed at block C1. By example, assuming that the user uttered speech that included the word 'one' at block F, after having depressed key 22a1 at block C, and that, as a result of the user depressing the key 22a1, memory location Z1 (which corresponds to memory location X1 and key 22a1) within data table T1 was indexed at block C1, then at block G the controller 18 stores acoustic characteristic information corresponding to the user's speech in this memory location Z1.

Control is then passed to block H where the mobile terminal 10 prompts the user to specify whether or not he wishes to assign a spoken word to another one of the keys 22a1–22a12, 22b1 of keypad 22. By example, at block H the controller 18 may control the display 20 so as to present a message 'select another key' to the user.

The user may then specify whether or not he wishes to assign a spoken word to another key 22a1–22a12, 22b1 by depressing one or more predetermined ones of the keys 22a1–22a12, 22b1 of the keypad 22 (block I). By example, assuming that at block I the user operates the keypad 22 so as to indicate that he does not desire to assign a spoken word to another one of the keys 22a1–22a12, 22b1 ('no' at block I), then control passes to block J where the operation of the keypad program mode is terminated.

Assuming that at block I the user operates the keypad 22 so as to indicate that he does wish to assign a spoken word to another key 22a1–22a12, 22b1 ('yes' at block I), then control passes through connector B1 back to block B, where the method continues in the manner described above.

It can be appreciated in view of the foregoing description and FIGS. 3a and 3b that the user can assign a selected, identifying utterance (including, e.g., a selected word) to any selected number of the keys 22a1–22a12, 22b1 of keypad 22, using the above-described procedure. By example, in accordance with the above-described procedure, the user may assign spoken identifying words, such as the words 'one', 'two', 'three', 'four', 'five', 'six', 'seven', 'eight', and 'nine', to the keys 22a1–22a9, respectively, as is represented within data table T1 of FIG. 1c. Also, by example, the user may assign identifying words such as 'zero', 'asterisk', 'pound', and 'send', to keys 22a11, 22a10, 22a12, and 22b1, respectively, as is represented in data table T1 of FIG. 1c.

It should be noted that the user may also assign other selected identifying words to selected ones of the keys 22a1–22a12, 22b1, besides those described in the examples given above. By example only, the user may assign a spoken word such as 'apple', or some other selected, spoken word, to selected ones of the keys 22a1–22a12, 22b1. Also by example, the user may assign words (e.g., 'uno', 'dos', 'tres', etc.) spoken in any selected language to selected ones of the keys 22a1–22a12, 22b1. Moreover, it should be noted that the invention is not limited to enabling the user to assign only spoken words, rather than other acoustic sounds, to selected ones of the keys 22a1–22a12, 22b1. By example, in accordance with the invention, the user may assign other selected, individual acoustic sounds (e.g., tones, non-word utterances, etc.,) to selected ones of the keys 22a1–22a12, 22b1. It can therefore be appreciated that the method of the invention does not limit the user to employing only particular words, acoustic sounds/characteristics, languages, and speech inflections (user voice accents), for identifying the keys 22a1–22a12, 22b1 of the keypad 22. As such, the technique of the invention enables the user to customize his own acoustic identifiers for the keys 22a1–22a12, 22b1.

Another aspect of the invention will now be described. In accordance with this aspect of the invention, the user may command the mobile terminal 10 to automatically dial a telephone number for placing a call, by speaking (into the microphone 19) words identifying those ones of the keys 22a1–22a12, 22b1, which correspond to characters of the telephone numbers. This aspect of the invention may be further understood in view of the flow diagram shown in FIGS. 4a and 4b. It should be noted that in the following description of the flow diagram of FIGS. 4a and 4b, it is assumed that the user previously assigned spoken digit words (e.g., 'one', 'two', 'three', 'four', 'five', 'six', 'seven', 'eight', 'nine', and 'zero') to the respective keys 22a1–22a9 and 22a11 of keypad 22 (in accordance with the above-described technique), as is represented in the data table T1 of FIG. 1c.

Figure 4A:
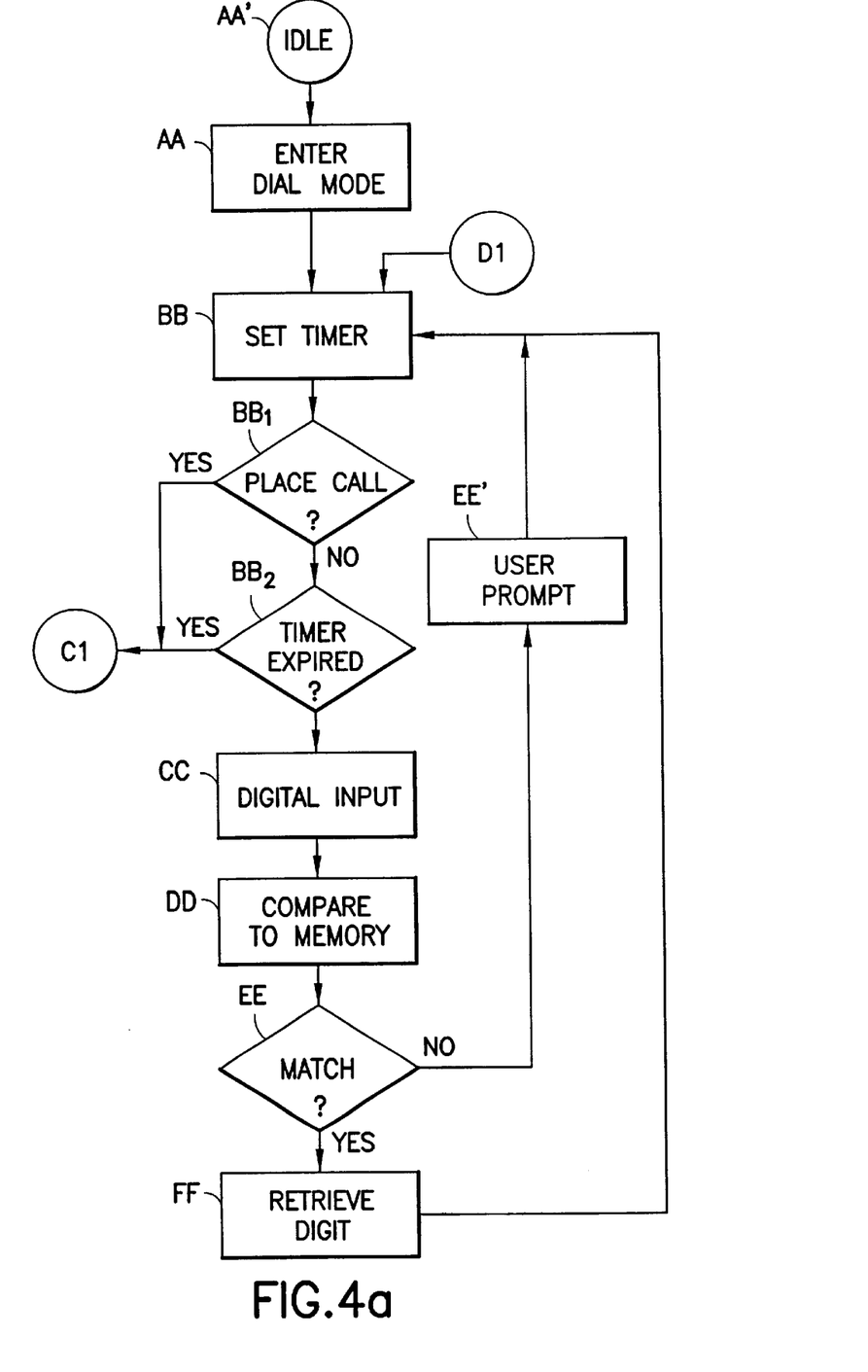
FIGS. 4a and 4b show logic flow diagrams that illustrate another method executed by the mobile terminal shown in FIGS. 1a and 2, in accordance with the invention.

Referring now to FIG. 4a, at block AA' it is assumed that the mobile terminal 10 is operating in an idle mode. Some- time later, it is assumed that the user operates the mobile terminal 10 so as to cause the mobile terminal 10 to enter a 'call dialing' mode (block AA). By example, the 'call dialing' mode may be entered in response to the user depressing one or more predetermined keys 22a, 22b of keypad 22.

After the step indicated by block AA has been performed, control passes to block BB where the controller 18 sets the timer 18a to run and the mobile terminal 10 prompts the user to utter a first digit of a selected telephone number (of a destination telephone) into the microphone 19. The mobile terminal 10 then waits for the user to utter the first digit of the selected telephone number. By example, the mobile terminal 10 may prompt the user at block BB by presenting a message on the display 20 reading "specify digit of telephone number".

In accordance with an aspect of the invention, while the mobile terminal 10 is operating in the 'call dialing' mode, the user may operate the mobile terminal 10 for indicating when he has completed specifying a telephone number, and for specifying that an attempt be made to place the call to a destination telephone identified by the user-specified telephone number. This aspect of the invention is represented by block BB1, and will be further described below. For the purposes of this description, it is assumed that after the 'call dialing' mode is initially entered, the user desires to input digits of the telephone number into the mobile terminal 10, before specifying that the call be attempted (i.e., the user does not yet specify that the call be attempted) ('no' at block BB1).

At block BB2 the controller 18 examines the timer 18a to determine whether or not a predetermined time period has elapsed (since the timer 18a was originally set at block BB) before the mobile terminal 10 receives a voice input from the user. The predetermined time period is preferably pre-programmed into the controller 18, and may be of any suitable duration (e.g., 10 seconds, or 20 seconds, etc.).

Assuming that, prior to the elapse of the predetermined time period ('no' at block BB2), the user utters a digit (e.g., such as the word 'four') of the telephone number into the microphone 19 (block CC), then the microphone 19 responds to the user's utterance by generating an electrical signal (e.g., an analog signal) which corresponds to the user's utterance. The electrical signal is then forwarded to the vocoder 19a, which responds to receiving the signal by providing corresponding acoustic characteristic information representing the user's utterance to the controller 18, as was described previously for the programming mode of operation.

Control then passes to block DD where the controller 18 responds to receiving the acoustic characteristic information from vocoder 19a by comparing this acoustic characteristic information to the acoustic characteristic information stored in the memory locations Z1–Zn of data table T1, in order to determine whether or not the acoustic characteristic information received from vocoder 19a is substantially similar to that stored in any one of the memory locations Z1–Zn.

If the controller 18 determines that the acoustic characteristic information received from vocoder 19a is not substantially similar to the information stored in any of the memory locations Z1–Zn ('no' at block EE), then control passes to block EE' where the mobile terminal 10 presents a message to the user indicating that the user's uttered word is not recognized by the mobile terminal 10. By example, this step may be performed by the controller 18 controlling the display 20 so as to present a message to the user reading 'sorry, word not recognized'. Thereafter, control passes back to block BB where the method is assumed to continue in the manner described above.

Alternatively, the controller 18 could display the closest matching character, followed by a question mark (e.g., "7?"), thereby enabling the user to accept or reject the displayed character.

If the controller 18 determines at block EE that the acoustic characteristic information received from vocoder 19a is substantially similar to the information stored in one of the memory locations Z1–Zn from column Z ('yes' at block EE), then control passes to block FF where the mobile terminal 10 retrieves information from a particular one of the memory locations Y1–Yn (from column Y) which corresponds to the memory location Z1–Zn from column Z, and stores the retrieved information in the memory buffer 25. By example, assuming that the user uttered 'one' into the microphone 19 at block CC, and that acoustic characteristic information corresponding to the user's utterance of the word 'one' is stored in memory location Z1 (as is represented in FIG. 1c), then the performance of the steps DD and EE results in the controller 18 retrieving information (e.g., information representing '1') from memory location Y1 at block FF, and storing the retrieved information in memory buffer 25. In a preferred embodiment of the invention the controller 18 also controls the display 20 at block FF so as to present this retrieved information (e.g., '1') on the display 20.

After the step identified by block FF is performed, control passes back to block BB where the timer 18a is reset, the user is prompted to enter a next digit of the telephone number, and the method continues in the manner described above, for enabling the user to enter another individual digit of the telephone number.

As can be appreciated in view of the foregoing description and FIG. 4a, by uttering individual digits (or letters) of a telephone number into the mobile terminal 10 using the above-described technique, the user may enter a complete telephone number into the mobile terminal 10.

As was previously described, after the user has entered all of the digits of the telephone number into the mobile terminal 10, the user may operate the mobile terminal 10 for indicating that he has completed entering the telephone number, and for commanding the mobile terminal 10 to attempt placing a call to the destination telephone identified by the telephone number. By example, it is assumed that after the user has spoken each of the individual telephone number digits into the mobile terminal 10 using the above-described technique, information retrieved from particular ones of the memory locations Y1–Yn corresponding to the spoken digits is stored in the memory buffer 25. It is also assumed that after information corresponding to a last one of the user-spoken digits is retrieved at block FF, the step of block BB is again performed, and the user desires to attempt to place the call to the destination telephone. In accordance with the invention, the user may command the mobile terminal 10 to attempt placing the call by either depressing at least one predetermined key (e.g., the 'SEND' key 22b1) of keypad 22, or by speaking a command into the microphone 19 specifying that the call be placed ('yes' at block BB1). By example, in accordance with one embodiment of the invention, assuming that the user previously assigned a spoken word (e.g., 'send') to the key 22b1 (e.g., the 'SEND' key) in accordance with the key programming mode described above, for identifying the key 22b1 with this spoken word ('yes' at block GG), then the command spoken by the user at block BB1 may be the word (e.g., 'send') which identifies the key 22b1.

Assuming that at block BB1 the user specifies that the call be placed by depressing the at least one predetermined key (e.g., the 'SEND' key 22b1) ('yes' at block BB1), then control passes to through connector C1 to block GG (FIG. 4b) where another step is performed in a manner as will be described below.

Assuming that at block BB1 the user specifies that the call be placed by speaking the command (e.g., 'send') into the microphone 19, then the microphone 19 responds by generating an electrical signal (e.g., an analog signal) which corresponds to the user's voice input. The electrical signal is then provided by the microphone 19 to the vocoder 19a, which responds to the electrical signal by outputting, to the controller 18, acoustic characteristic information representing the user's voice input. In response to receiving this information, the controller 18 associates the information with that stored in memory location Z13, and then retrieves information (specifying that a call be placed) from associated memory location Y13. Control then passes to through connector C1 to block GG (FIG. 4b) where another step is performed in a manner as will be described below.

In accordance with another aspect of the invention, after the user has entered all of the digits of the telephone number into the mobile terminal 10, the user may simply wait until the timer 18a reaches the predetermined time period, in which case the mobile terminal 10 automatically attempts to place the call. By example, it is assumed that after the user has spoken each of the individual telephone number digits into the mobile terminal 10 using the above-described technique, information retrieved from particular ones of the memory locations Y1–Yn corresponding to the spoken digits is stored in the memory buffer 25. It is also assumed that after information corresponding to a last one of the user-spoken digits is retrieved at block FF, the step of block BB is again performed, where the timer 18a is reset. Assuming that the user does not enter any additional information into the mobile terminal (either by speaking words or operating the keypad 22) ('no' at block BB1), and that the timer 18a then reaches the predetermined time period ('yes' at block BB2), then control passes through connector C1 to block GG of FIG. 4b.

Figure 4B:
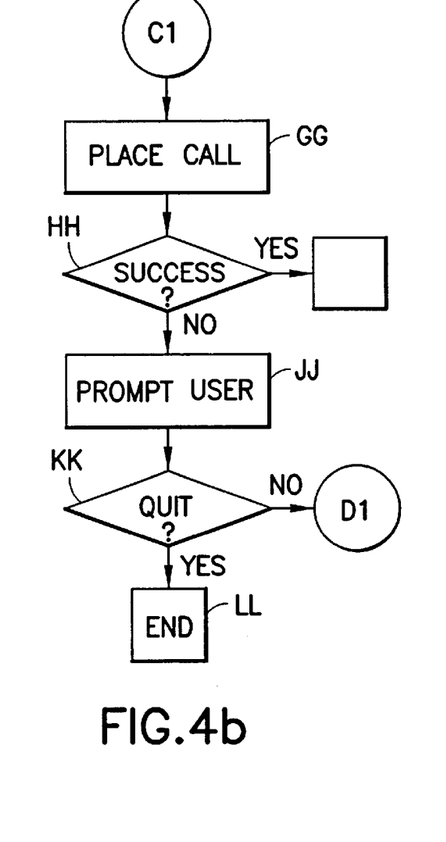

Referring now to FIG. 4b, the step of Block GG will now be described. At block GG the controller 18 retrieves the information (representing the telephone number digits) stored in the memory buffer 25, and employs this information to automatically dial a telephone number for the destination telephone. Then the controller 18 controls the transmitter 14 so as to attempt to place a call to the destination telephone (block GG), by way of base station 30. Assuming that the call is successfully placed to the destination telephone ('yes' at block HH), then control passes to block II where the method is terminated.

If the call is not successfully placed, and this is recognized by the mobile terminal 10 ('no' at block HH), then control passes to block JJ where the mobile terminal 10 presents, on the display 20, a message prompting the user to indicate whether or not he wishes to place another call from the mobile terminal 10.

It should be noted that the manner in which the mobile terminal 10 determines whether or not a telephone call has been successfully placed is not considered to be germane to the invention, and may be accomplished in accordance with any suitable technique, such as, by example only, those described in IS-136.2, Rev. A or later revisions thereof (see, e.g., IS-136.2, Rev. A. Section 2.6.4.3.2).

At block KK the user may indicate that he wishes to place another call by depressing one or more predetermined keys of keypad 22 ('yes' at block KK). Thereafter, the mobile terminal 10 responds by passing control through connector D1 back to block BB of FIG. 4a, where the method proceeds in the manner described above.

Assuming that the user operates the mobile terminal 10 so as to indicate that he desires to not place another call ('yes' at block KK), then control passes to block LL where the method is terminated.

Figure 4C:
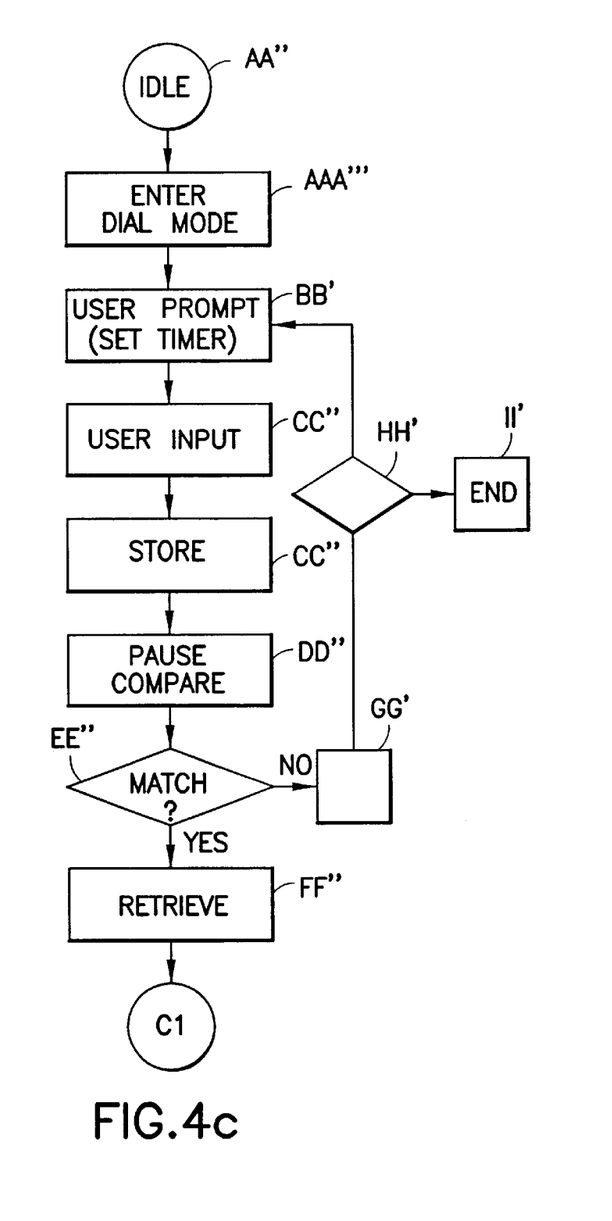
FIG. 4c shows a logic flow diagram that illustrates a method executed by the mobile terminal shown in FIGS. 1a and 2, in accordance with the invention.

Reference is now made to FIG. 4c which shows a flow diagram of a method in accordance with another embodiment of the invention. In this embodiment of the invention, blocks AA" and AA'" are performed in a similar manner as was described above for blocks AA' and AA, respectively, of FIG. 4a. After the step indicated by block AA'" n is performed, control passes to block BB' where the mobile terminal 10 prompts the user to speak a selected, complete telephone number into the microphone 19 for placing a call to a destination telephone identified by the telephone number. By example, the mobile terminal 10 may prompt the user by presenting a message on the display 20 reading "enter telephone number". In accordance with one embodiment of the invention, the timer 18a is also set to run at block BB'.

At block CC' it is assumed that the user utters all of the digits (e.g., such as '5551212') of a selected telephone number into microphone 19. The microphone 19 then generates a corresponding electrical signal in the manner described above. The electrical signal is then forwarded to the vocoder 19a, which responds by providing acoustic characteristic information corresponding to the individual user-spoken digits to the controller 18. In response to receiving the acoustic characteristic information, the controller 18 stores the information in the memory buffer 25 (block CC,").

It should be noted that at block CC' the user may also indicate to the mobile terminal 10 that he is done reciting the telephone number, for causing the mobile terminal 10 to attempt placing the call. By example, after uttering the telephone number into the microphone 19 at block CC', and assuming that the user previously assigned a spoken word (e.g., 'send') to the key 22b1 (e.g., the 'SEND' key) in accordance with the key programming mode described above (i.e., assuming that memory location Z13, which corresponds to key 22b1, stores acoustic characteristic information corresponding to the user-spoken word), then the user may specify that the call be placed by uttering the word (e.g., 'send') into the microphone 19. The user's utterance is then converted to an electrical signal by the microphone 19, and the electrical is provided to the vocoder 19a in a similar manner as was described above. In response to receiving the electrical signal, the vocoder 19a provides acoustic characteristic information corresponding to the user's utterance to the controller 18, in the manner described above. The controller 18 then stores this acoustic characteristic information in the memory buffer 25, along with the acoustic characteristic information representing the telephone number digits.

The manner in which the mobile terminal 10 operates after acoustic characteristic information has been stored in memory buffer 25 will now be described. After block CC" is performed, control passes to block DD' where the controller 18 parses the information previously stored in memory buffer 25 at block CC". Preferably, this step is performed in accordance with any suitable speech information parsing technique, so that acoustic characteristic information representing individual ones of the spoken digits is separated from the acoustic characteristic information representing other ones of the spoken digits. Also, assuming that the user uttered a word (e.g., 'send') at block C' specifying that the call be placed, the parsing step is also preferably performed so as to separate the acoustic characteristic information representing this word from the acoustic characteristic information representing the respective digits. By example, assuming that the acoustic characteristic information stored previously in the memory buffer 25 at block CC" represents user-utterances of the words 'one', 'two', 'three', 'four', 'five', 'six', 'seven', and 'send', respectively, wherein consecutive ones of the words were spoken by the user with a pause in between the words, then the controller 18 parses the information so as to separate the information representing the user's utterance of each individual word from information representing the user's utterances of other ones of the words.

After the controller 18 parses the acoustic characteristic information at block DD', control passes to block EE' where the controller 18 compares the acoustic characteristic information representing respective ones of the user-uttered telephone number digits to the acoustic characteristic information stored in the memory locations Z1–Zn to determine whether or not the compared information is substantially similar. Also at block EE', and assuming that at block CC' the user also uttered a word (e.g., 'send') specifying that the call be placed, and that the parsing step of block DD' was performed in a similar manner as was described above, then the controller 18 compares the parsed acoustic characteristic information representing the user's utterance of the word to the information stored in the memory locations Z1–Zn to determine whether or not the compared information is substantially similar.

If the controller 18 determines that the acoustic characteristic information representing respective ones of the user-uttered digits is substantially similar to information stored in respective ones of the memory locations Z1–Zn within data table T1 (i.e., assuming that each spoken digit corresponds to information stored in a respective one of the memory locations Z1–Zn) ('yes' at block EE'), then the controller 18 indexes the memory locations Y1–Yn from column Y corresponding to these memory locations Z1–Zn (block FF'), and then retrieves the information stored in these indexed memory locations Y1–Yn. Also, assuming that at block EE' the controller 18 compared acoustic characteristic information representing the user's utterance specifying that the call be placed to the information stored in the memory locations Z1–Zn, and that memory location Z13 (which corresponds to key 22b1) stores acoustic characteristic information corresponding to the user's utterance, then at block FF' the controller 18 indexes, and retrieves the contents of, memory location Y13 (which is associated with memory location Z13 and which stores information specifying that the mobile terminal 10 place a telephone call).

In response to the controller 18 retrieving the information from memory location Y13, the mobile terminal 10 automatically dials a telephone number (for the destination telephone) corresponding to the user-uttered telephone number digits, using the information retrieved from the memory locations Y1–Yn, and then the controller 18 controls the transmitter 14 so as to attempt to place a call to the destination telephone (by way of base station 30) (block GG of FIG. 4b). Thereafter, the steps identified by block HH and the remaining blocks of FIG. 4b are performed in a similar manner as was described above.

If the controller 18 determines that acoustic characteristic information representing any one of the user-uttered telephone number digits, or the acoustic characteristic information representing the user's utterance of the command (e.g., 'send') specifying that the mobile terminal 10 place the call, is not substantially similar to the information stored in any of the memory locations Z1–Zn ('no' at block FF'), then control passes to block GG' where the controller 18 clears the contents of the memory buffer 25. Thereafter, at block HH', the mobile terminal 10 prompts the user to specify whether or not he wishes to attempt placing another telephone call. By example, this step may be performed by the controller controlling the display 20 so as to present a message 'do you wish to place another call?' to the user.

Assuming that the user operates the mobile terminal 10 (e.g., by depressing one or more predetermined keys of keypad 22) so as to indicate that he does not wish to attempt placing another call ('no' at block HH'), then the mobile terminal 10 responds by terminating the call dialing mode procedures (block II').

Assuming that at block HH' the user operates the mobile terminal 10 (e.g., by depressing one or more predetermined keys of keypad 22) so as to indicate that he does wish to attempt placing another call ('yes' at block HH'), then control passes to block BB' where the method proceeds in the manner described above.

It should be noted that although the flow diagram of FIG. 4c is described in the context of the user specifying that the call be placed after specifying the telephone number to the mobile terminal 10, the user may also specify that the call be placed by, for example, depressing the 'SEND' key 22b1 after the telephone number has been specified by the user. It is also within the scope of this invention for the mobile terminal 10 to automatically attempt placing the call after a predetermined time interval has expired. By example, in accordance with one embodiment of the invention, timer 18a is set to run at block BB'. Assuming that the user utters the telephone number into the microphone 19 in the above-described manner, but does not utter a command (e.g., 'send') for specifying that the call be placed, then the steps identified by blocks DD', EE' and FF' are performed in a similar manner as described above until the timer 18a reaches the predetermined time interval. Upon the timer 18a reaching the predetermined time interval, which is preferably of sufficient duration (e.g., 25 seconds) for enabling the user to utter a complete telephone number into the mobile terminal 10, control passes through connector C1 to block GG of FIG. 4b, where the mobile terminal 10 attempts to place the call in a similar manner as was described above.

In view of the foregoing description, it can be appreciated that the keypad program mode of the invention enables the user to assign selected words for identifying the keys 22a1–22a12, 22b1 of the keypad 22, and that the call dialing mode of the invention enables the user to place an outgoing call from the mobile terminal 10 to a destination telephone identified by a telephone number by uttering, into the microphone 19, words identifying individual ones of the keys which correspond to the telephone number. By example, it is assumed that the user previously assigned the words 'one', 'two', 'three', 'four', 'five', 'six', and 'seven', as identifiers for the keys 22a1–22a7, respectively, in accordance with the keypad programming mode of the invention, wherein each key corresponds to information representing '1'–'7', as is represented in column Y of data table T1 (FIG. 1c). Assuming that the user then desires to place a call to a destination telephone identified by telephone number '1234567', then, in accordance with the call dialing mode of the invention, the user may simply utter the words 'one', 'two', 'three', 'four', 'five', 'six', and 'seven', into the microphone 19, and then specify that the call be placed, for causing the mobile terminal 10 to place the call to the destination telephone. Also, the user may assign to the keypad keys words other than those corresponding to the keys. This may be helpful to the user in cases where he needs to dial a telephone number in a crowded place, but desires to keep the telephone number secret.

While the invention has been particularly shown and described with respect to preferred embodiments thereof, it will be understood by those skilled in the art that changes in form and details may be made therein without departing from the scope and spirit of the invention. By example, and as was previously described, the teaching of this invention is not limited for use with any one particular type of communication protocol (such as the one specified by IS-136). Also, although the invention is described in the context of the mobile terminal 10 prompting the user for performing certain operations by presenting various messages of the display 20, it is also within the scope of this invention for the mobile terminal 10 to prompt the user by controlling the speaker 17 so as to output a tone or series of tones, for prompting the user to perform these operations. Furthermore, although the invention is described in the context of assigning uttered words to keypad keys 22a1–22a12, 22b1, of the mobile terminal 10, it is not intended that the invention be so limited. By example, it is also within the scope of this invention for the above-described method to be employed for enabling a user to assign spoken words to other types of manually-driven input devices, including external input devices that are coupled to the mobile terminal 10. For example, if the mobile terminal 10 is connected to a computer, the method of the invention can be employed for enabling the user to assign spoken words to keys of a keypad of the computer, and user-generated messages can be output from the computer from a cable or an IR link, and can be displayed on the computer's screen.

What is claimed is:

1. A radiotelephone, comprising:
   a first input user interface, said first input user interface including a plurality of keys;
   a second input interface for receiving user-uttered speech, said second input interface being responsive to receiving the user-uttered speech for providing a speech output signal;
   an output user interface;
   a memory, said memory including a first plurality of memory locations, each of the first plurality of memory locations being associated with a respective one of the keys;
   a voice encoder coupled to said second input user interface, said voice encoder being responsive to receiving said speech output signal for outputting information representing acoustic characteristics of the user-uttered speech;
   a controller coupled to said first input user interface, said output user interface, said memory, said voice encoder, and to said second input user interface, said controller being responsive to detecting user-input information specifying that a program mode be entered for controlling said output user interface so as to prompt the user to depress at least one of the keys, said controller also being responsive to the user depressing each individual key for indexing the memory location associated with the individual key and for controlling said output user interface so as to prompt the user to utter a speech identifier for the individual key, said controller then being responsive to receiving information output from said voice encoder for storing the information in the indexed memory location as an identifier for the individual key.

2. A radiotelephone as set forth in claim 1, wherein said memory also includes a second plurality of memory locations, each of the second plurality of memory locations being associated with a respective one of the keys and storing information corresponding to a respective character, wherein said controller is responsive to detecting user-input information specifying that a call dialing mode be entered for controlling said output user interface so as to prompt the user to specify a telephone number for a destination telephone to which the user desires to place a call, said controller then being responsive to receiving information output by said voice encoder for associating this information to information stored in the first plurality of memory locations, and with information from associated ones of the second plurality of memory locations, said controller being responsive to associating the information output by said voice encoder to the information stored in the second plurality of memory locations for controlling said transmitter so as to place a call to the destination telephone.

\* \* \* \* \*